(12) United States Patent
Pieterse et al.

(10) Patent No.: US 8,168,564 B2
(45) Date of Patent: May 1, 2012

(54) CATALYST SUPPORT

(76) Inventors: Coen Willem Johannes Pieterse, Amsterdam (NL); Guy Lode Magda Maria Verbist, Amsterdam (NL)

( * ) Notice: Subject to any disclaimer, the term of this patent is extended or adjusted under 35 U.S.C. 154(b) by 319 days.

(21) Appl. No.: 12/277,684

(22) Filed: Nov. 25, 2008

(65) Prior Publication Data

US 2009/0134062 A1 May 28, 2009

(30) Foreign Application Priority Data

Nov. 27, 2007 (EP) .................................. 07121619

(51) Int. Cl.
*B01J 21/04* (2006.01)
*B01J 23/02* (2006.01)

(52) U.S. Cl. .......................... 502/439; 96/290; 248/694

(58) Field of Classification Search .............. 502/527.19
See application file for complete search history.

(56) References Cited

U.S. PATENT DOCUMENTS

| | | | |
|---|---|---|---|
| 3,994,831 A | 11/1976 | Betz | 252/458 |
| 4,110,418 A * | 8/1978 | Martin | 261/98 |
| 4,530,918 A | 7/1985 | Sambrook et al. | 502/303 |
| 4,645,754 A | 2/1987 | Tamura et al. | 502/527 |
| 4,731,229 A | 3/1988 | Sperandio | 422/188 |
| 4,767,730 A * | 8/1988 | Soma et al. | 501/103 |
| 5,674,460 A | 10/1997 | Plog et al. | 422/177 |
| 6,624,114 B1 | 9/2003 | Eberle et al. | 502/439 |
| 7,122,707 B2 * | 10/2006 | Petzoldt et al. | 568/479 |

FOREIGN PATENT DOCUMENTS

| | | |
|---|---|---|
| DE | 4334981 | 4/1995 |
| DE | 19904398 | 8/2000 |
| EP | 0021736 | 1/1981 |
| EP | 0082614 | 6/1983 |
| EP | 464633 | 6/1991 |
| EP | 1108470 | 6/2001 |
| EP | 1570904 | 9/2005 |
| GB | 1446175 | 8/1976 |
| JP | 2005169319 | 6/2005 |
| WO | WO9205870 | 4/1992 |
| WO | WO9306041 | 4/1993 |
| WO | WO0207882 | 1/2002 |
| WO | WO2004014549 | 2/2004 |

OTHER PUBLICATIONS

Oil and Gas Journal, Sep. 6, 1971, pp. 86-90.

* cited by examiner

*Primary Examiner* — Melvin C Mayes
*Assistant Examiner* — Colin W Slifka

(57) ABSTRACT

A catalyst support in the shape of a non-planar ring having a bore; wherein there is no rotational symmetry around the axis extending through the center of the bore defined by the ring, and wherein the ratio of the thickness of the ring to the outer diameter of the ring is less than 0.5. The catalyst support shape is especially advantageous to pack within a fixed bed multitubular reactor such as that used for Fischer-Tropsch reactions. The packing of such shapes can reduce the pressure drop across the tubes with little or no difference in the porosity.

12 Claims, 1 Drawing Sheet

CATALYST SUPPORT

This application claims the benefit of European Application No. 07121619.6 filed Nov. 27, 2007.

FIELD OF THE INVENTION

This invention relates to a catalyst, catalyst precursor, or catalyst support, particularly in the shape of a ring. The invention especially relates to a catalyst, catalyst precursor, or catalyst support suitable for use in mass transfer limited reactions, such as Fischer-Tropsch reactions or hydrocracking reactions. The invention further relates to the use of a ring-shaped catalyst, catalyst precursor, or catalyst support.

BACKGROUND OF THE INVENTION

In the past a tremendous amount of work has been devoted to the development of catalytically active particles, for many different processes. There has also been a considerable effort to try to understand the advantages and sometimes disadvantages of effects of shape when deviating from conventional shapes such as pellets, rods, spheres and cylinders for use in catalytic as well as non-catalytic duties.

Examples of known shapes are cloverleafs, dumbbells and C-shaped particles and "polylobal"-shaped particles including TL (Trilobe) or QL (Quadrulobe) form. They serve as alternatives to the conventional cylindrical shape and often provide advantages because of their increased surface-to-volume ratio which enables the exposure of more catalytic sites.

Various documents, such as U.S. Pat. No. 4,645,754, WO 0207882, EP 1108470 and WO 04014549 have described the use of catalyst support in the shape of rings.

The Fischer-Tropsch process can be used for the conversion of hydrocarbonaceous feed stocks into liquid and/or solid hydrocarbons. The feed stock (e.g. natural gas, associated gas and/or coal-bed methane, coal) is converted in a first step into a mixture of hydrogen and carbon monoxide (this mixture is often referred to as synthesis gas or syngas). The synthesis gas is then converted in one or more steps over a suitable catalyst at elevated temperature and pressure into hydrocarbons, such as paraffinic compounds, ranging from methane to high molecular weight molecules comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi tubular fixed bed reactors, fluidised bed reactors, such as entrained fluidised bed reactors and fixed fluidised bed reactors, and slurry bed reactors such as three-phase slurry bubble columns and ebulated bed reactors.

SUMMARY OF THE INVENTION

According to a first aspect of the present invention there is provided a catalyst, catalyst precursor, or catalyst support in the shape of a non-planar ring having a bore in its plane; wherein there is no rotational symmetry around the axis extending through the centre of the bore defined by the ring, and wherein the ratio of the thickness of the ring to the outer diameter of the ring is less than 0.5, preferably less than 0.3.

DETAILED DESCRIPTION OF THE INVENTION

Figure 1:
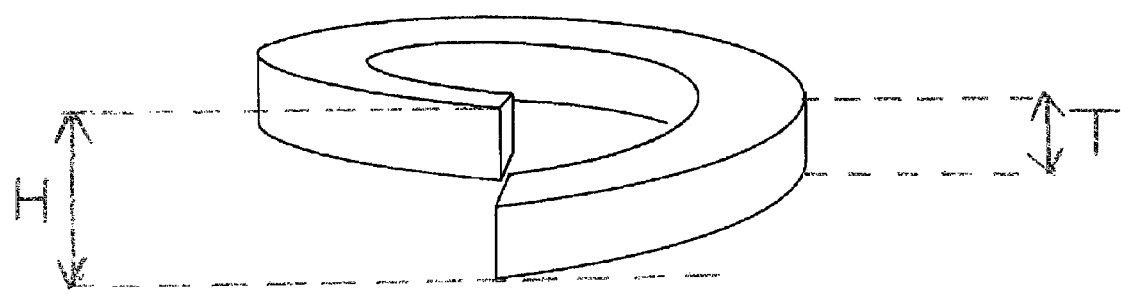
FIGS. 1-3 illustrate three different embodiments of non-planar rings.

A non-planar ring is defined as a ring having a height that is larger than the thickness of the ring. The height of the ring shape may, for example, be determined by:
 putting the ring on a plane, for example a flat table, with the axis through the bore perpendicular to this plane;
 letting another plane, for example a flat piece of metal sheet, approach the ring from above until it touches the ring, whereby both planes are kept parallel to each other;
 measuring the distance between the planes.
The height (H) of the non-planar ring is the distance between the two parallel planes at the moment that the approaching plane first touches the ring from above.

The height (H) of a non-planar ring is defined as the distance between two parallel planes, whereby the axis through the bore of the ring is perpendicular to these planes, and whereby both planes are touching the ring. This is exemplified in FIGS. 1, 2 and 3.

The thickness (T) of a non-planar ring may be determined by measuring the thickness at a part of the ring that is substantially planar. This is exemplified in FIGS. 1, 2 and 3. Such a measurement is preferably performed using a caliper, for example a vernier caliper. The thickness (T) of a non-planar ring may alternatively or additionally be determined using a microscope or one or more photographs of the ring. The thickness (T) of a non-planar ring may also be determined by:
 determining the volume of the ring;
 determining the outer and the inner diameter of the ring;
 calculating the thickness.
In a pragmatic approach based on volume measurement, the thickness of a ring with one circular bore may be calculated using the following formula:

$$T = 4V/(\pi(OD^2 - ID^2))$$

wherein T is thickness in m, V is volume in $m^3$, OD is outer diameter in m, and ID is inner diameter in m. The inner diameter of a ring with one circular bore is the diameter of the circular bore. This pragmatic approach can be straight forwardly extended to determine the thickness of a ring with a non-circular bore and/or with multiple bores. The thickness (T) of a non-planar ring may also be determined by:
 determining the mass of the ring;
 determining the density of the material of which the ring is made;
 determining the outer and the inner diameter of the ring;
 calculating the thickness.
In a pragmatic approach based on mass measurement, the thickness of a ring with one circular bore may be calculated using the following formula:

$$T = 4M/[\rho\pi(OD^2 - ID^2)]$$

wherein T is thickness in m, OD is outer diameter in m, ID is inner diameter in m, $\rho$ is density in $kg/m^3$, and M is mass in kg. The inner diameter of a ring with one circular bore is the diameter of the circular bore. This pragmatic approach can be straight forwardly extended to determine the thickness of a ring with a non-circular bore and/or with multiple bores.

A catalyst, catalyst precursor, or catalyst support in the shape of a non-planar ring according to the present invention preferably has a height (H) that is at least 1.2 times, more preferably at least 1.3 times, even more preferably at least 1.5 times the thickness (T) of the ring. A catalyst, catalyst precursor, or catalyst support in the shape of a non-planar ring having a bore according to the present invention preferably has a height (H) that is at most 5 times, more preferably at most 4 times the thickness (T) of the ring. The ratio between the height (H) and the thickness (T) of the ring preferably is between 1.2 and 5, more preferably between 1.3 and 4, even more preferably between 1.5 and 4.

The ratio of the thickness of the ring to the outer diameter of the ring of a catalyst, catalyst precursor, or catalyst support according to the present invention is less than 0.5, preferably less than 0.3, even more preferably less than 0.2. The ratio of the thickness of the ring to the outer diameter of the ring preferably is more than 0.05, more preferably more than 0.1. The thickness of the ring preferably is 0.1 mm or more. The thickness of the ring is preferably 0.7 mm or less. The outer diameter of the ring preferably is 2 mm or more, more preferably 4 mm or more. The outer diameter of the ring preferably is 25 mm or less, more preferably 20 mm or less, even more preferably 15 mm or less.

Rotational symmetry may be defined by a shape repeating itself as it is rotated around an axis. Where no rotational symmetry is present, the shape only repeats itself on rotation of 360° which is defined as the $C_1$ point group, whereas rotational symmetry is present if the shape repeats itself every, for example, 180° or 120° which is defined by the point groups $C_2$ and $C_3$ respectively.

A catalyst, catalyst precursor, or catalyst support according to the present invention has the shape of a non-planar ring with a bore in its plane. There is no rotational symmetry around the axis extending through the centre of the bore defined by the ring.

Preferably there is no symmetry across the plane orthogonal to the axis extending through the centre of the bore that is defined by the ring.

In a preferred embodiment, for at least one plane that includes the axis extending through the centre of the bore defined by the ring, there is no symmetry across that plane.

For certain embodiments the ring defines a single bore and no more. In other embodiments, the ring defines a plurality of bores. Preferably the ring contains 3 bores or less, more preferably 2 bores or less, most preferably 1 bore. In a preferred embodiment the ring defines a single bore and no more.

Preferably a bore is substantially in the centre of the ring.

Preferably a bore in the ring has a diameter of 1-5 mm. In case the ring contains a single bore of 1-5 mm and no more, the inner diameter of the ring is 1-5 mm.

The ring defines a hole or bore. The ring may be continuous or discontinuous. Thus for embodiments with a discontinuous ring, the hole is not defined by the ring throughout its 360° periphery.

Preferably the ring is at least partially curved, more preferably helix shaped. The ring may, for example, have the shape of a saddle with a hole or bore in it. If the ring has a helix shape, it has at least 0.8 turns and at most 1.5 turns.

Preferably the outer circumference of the ring is circular in shape. Alternatively, the outer circumference of the ring may be polygonal in shape, such as square shaped.

Preferably the inner circumference of the ring, defining the bore, is circular in shape. Alternatively, the inner circumference of the ring is polygonal in shape, such as square shaped.

The ring may comprise a metal structure. Such a ring may additionally comprise a refractory oxide such as titania, silica, alumina, magnesia, zirconia and mixtures thereof. The most preferred refractory oxide carrier material is titania. In a preferred embodiment the ring comprises a metal structure which is coated with a refractory oxide, most preferably coated with titania. In such embodiment the thickness of the coating preferably is less than 500 μm. In such embodiment the thickness of the coating preferably is more than 50 μm. More preferably the refractory oxide coating on the metal structure is around 200 μm thick.

If, for example, a metal sheet in the shape of a ring with a bore in its plane is coated with a refractory oxide, the total thickness of the coating preferably is less than 500 μm and more than 50 μm. More preferably the metal sheet is coated on one side with less than 250 μm and more than 25 μm, and on the other side with less than 250 μm and more than 25 μm.

In an alternative embodiment the ring consists of a refractory oxide such as titania, silica, alumina, magnesia, zirconia and mixtures thereof, preferably titania.

For a Fischer-Tropsch reaction, one suitable catalyst comprises cobalt as the catalytically active metal and zirconium as a promoter. Another suitable catalyst comprises cobalt as the catalytically active metal and manganese and/or vanadium as a promoter.

According to a further aspect of the present invention there is provided a process for the production of liquid hydrocarbons from synthesis gas, the process comprising the step of:
converting synthesis gas in a reactor into liquid hydrocarbons, and optionally solid hydrocarbons and optionally liquefied petroleum gas, at elevated temperatures and pressures; using a catalyst as defined herein.

The production of liquid hydrocarbons may be conducted in a multitubular fixed bed reactor. A catalyst in the shape of a non-planar ring having a bore in its plane according to the present invention is especially suitable to be used in a multitubular fixed bed reactor.

The inner diameter of the ring is preferably 1-5 mm.

The outer diameter of the ring may be more than 5%, preferably more than 10% of the diameter of the reactor tube.

The outer diameter of the ring is less than 50%, preferably less than 33% of diameter of the reactor tube.

The invention also provides hydrocarbon products synthesised by a Fischer-Tropsch reaction and catalysed by a catalyst as defined herein.

The Fischer-Tropsch process is well known to those skilled in the art and involves synthesis of hydrocarbons from syngas, by contacting the syngas at reaction conditions with the Fischer-Tropsch catalyst.

The synthesis gas can be provided by any suitable means, process or arrangement. This includes partial oxidation and/or reforming of a hydrocarbonaceous feedstock as is known in the art.

Typically the synthesis gas is produced by partial oxidation of a hydrocarbonaceous feed. The hydrocarbonaceous feed suitably is methane, natural gas, associated gas or a mixture of $C_{1-4}$ hydrocarbons. The feed comprises mainly, i.e. more than 90 v/v %, especially more than 94%, $C_{1-4}$ hydrocarbons, especially comprises at least 60 v/v percent methane, preferably at least 75 percent, more preferably 90 percent. Very suitably natural gas or associated gas is used. Sulphur in the feedstock is preferably removed or at least minimised.

The partial oxidation of gaseous feedstocks, producing mixtures of especially carbon monoxide and hydrogen, can take place according to various established processes. These processes include the Shell Gasification Process. A comprehensive survey of this process can be found in the Oil and Gas Journal, Sep. 6, 1971, pp 86-90.

The oxygen containing gas for the partial oxidation typically contains at least 95 vol. %, usually at least 98 vol. %, oxygen. Oxygen or oxygen enriched air may be produced via cryogenic techniques, but could also be produced by a membrane based process, e.g. the process as described in WO 93/06041. A gas turbine can provide the power for driving at least one air compressor or separator of the air compression/separating unit. If necessary, an additional compressing unit may be used after the separation process, and the gas turbine in that case may also provide at the (re)start power for this compressor. The compressor, however, may also be started at a later point in time, e.g. after a full start, using steam generated by the catalytic conversion of the synthesis gas into hydrocarbons.

To adjust the $H_2/CO$ ratio in the syngas, carbon dioxide and/or steam may be introduced into the partial oxidation process. Preferably up to 15% volume based on the amount of syngas, preferably up to 8% volume, more preferably up to 4% volume, of either carbon dioxide or steam is added to the feed. Water produced in the hydrocarbon synthesis may be used to generate the steam. As a suitable carbon dioxide source, carbon dioxide from the effluent gasses of the expanding/combustion step may be used. The $H_2/CO$ ratio of the syngas is suitably between 1.5 and 2.3, preferably between 1.6 and 2.0. If desired, (small) additional amounts of hydrogen may be made by steam methane reforming, preferably in combination with the water gas shift reaction. Any carbon monoxide and carbon dioxide produced together with the hydrogen may be used in the gasification and/or hydrocarbon synthesis reaction or recycled to increase the carbon efficiency. Hydrogen from other sources, for example hydrogen itself, may be an option.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

A preferred regime for carrying out the Fischer-Tropsch process is a fixed bed regime, especially a trickle flow regime. A very suitable reactor is a multitubular fixed bed reactor. In addition, the Fischer-Tropsch process may also be carried out in a fluidised bed process.

Another regime for carrying out the Fischer-Tropsch reaction is a slurry phase regime or an ebullating bed regime, wherein the catalyst particles are kept in suspension by an upward superficial gas and/or liquid velocity.

Products of the Fischer-Tropsch synthesis may range from methane to heavy paraffin waxes. Preferably, the production of methane is minimised and a substantial portion of the hydrocarbons produced have a carbon chain length of a least 5 carbon atoms. Preferably, the amount of $C_{5+}$ hydrocarbons is at least 60% by weight of the total product, more preferably, at least 70% by weight, even more preferably, at least 80% by weight, most preferably at least 85% by weight.

The hydrocarbons produced in the process are suitably $C_{3-200}$ hydrocarbons, more suitably $C_{4-150}$ hydrocarbons, especially $C_{5-100}$ hydrocarbons, or mixtures thereof. These hydrocarbons or mixtures thereof are liquid or solid at temperatures between 5 and 30° C. (1 bar), especially at about 20° C. (1 bar), and usually are paraffinic of nature, while up to 30 wt %, preferably up to 15 wt %, of either olefins or oxygenated compounds may be present.

Depending on the catalyst and the process conditions used in a Fischer-Tropsch reaction, various proportions of normally gaseous hydrocarbons, normally liquid hydrocarbons and optionally normally solid hydrocarbons are obtained. It is often preferred to obtain a large fraction of normally solid hydrocarbons. These solid hydrocarbons may be obtained up to 90 wt % based on total hydrocarbons, usually between 50 and 80 wt %.

A part may boil above the boiling point range of the so-called middle distillates. The term "middle distillates", as used herein, is a reference to hydrocarbon mixtures of which the boiling point range corresponds substantially to that of kerosene and gasoil fractions obtained in a conventional atmospheric distillation of crude mineral oil. The boiling point range of middle distillates generally lies within the range of about 150 to about 360° C.

The higher boiling range paraffinic hydrocarbons, if present, may be isolated and subjected to a catalytic hydrocracking step, which is known per se in the art, to yield the desired middle distillates.

More generally any catalytic hydrocracking reaction regardless of the source of the hydrocarbons, may be in accordance with one embodiment of the present invention as the hydrocracking may be done in a reactor comprising catalyst particles as described herein.

Thus according to one embodiment of the invention, there is provided a process of cracking hydrocarbons using a catalyst as defined herein.

The catalytic hydrocracking is carried out by contacting the paraffinic hydrocarbons at elevated temperature and pressure and in the presence of hydrogen with a catalyst as described herein containing one or more metals having hydrogenation activity, and supported on a support comprising an acidic function. Suitable metals can be selected from Groups VIB and VIII of the (same) Periodic Table of Elements. Preferably, the hydrocracking catalysts in accordance with the present invention contain one or more noble metals from Group VIII. Preferred noble metals are platinum, palladium, rhodium, ruthenium, iridium and osmium. Most preferred catalysts for use in hydrocracking are those comprising platinum.

The amount of catalytically active noble metal present in the hydrocracking catalyst may vary within wide limits and is typically in the range of from about 0.05 to about 5 parts by weight per 100 parts by weight of the support material. The amount of non-noble metal present is preferably 5-60 parts by weight per 100 parts by weight of the support material, preferably 10-50.

Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

Certain embodiments of the present invention comprise a Fischer-Tropsch process using a catalyst as described herein, and a hydrocracking step using a hydrocracking catalyst, the hydrocracking catalyst not in accordance with the present invention.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may be transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired.

The hydrocarbon products may have undergone the steps of hydroprocessing, preferably hydrogenation, hydroisomerisation and/or hydrocracking.

The hydrocarbon products may be a fuel, preferably naphtha, kerosene or gasoil, a waxy raffinate or a base oil.

EXAMPLES

Example 1

Figure 2:
Figure 3:
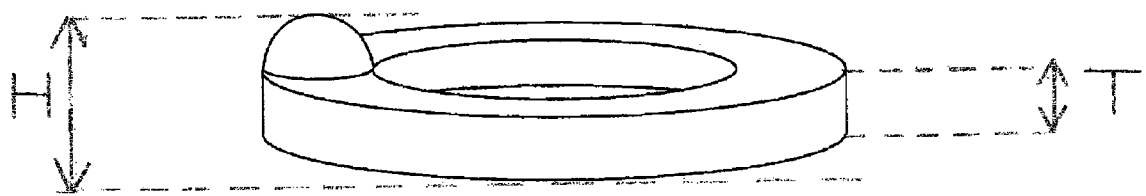

Embodiments of the present invention will now be described, by way of example only, with reference to the accompanying FIGS. 1-3. FIG. 1 is a perspective view of a first embodiment of the present invention, showing a catalyst with a spiral or spring-washer shape. FIG. 2 is a perspective view of a second embodiment of the present invention, showing a catalyst with an asymmetric ring shape. FIG. 3 is a perspective view of a third embodiment of the present invention showing a catalyst with a further asymmetric ring shape.

A catalyst according to the present invention, which may for example have a shape as illustrated in FIGS. 1-3, may be used for a wide variety of different applications including but not limited to a Fischer-Tropsch reaction. The catalyst may be made from a wide variety of materials, such as refractory oxides, and active components, depending on the specific application of the catalyst. In use the catalyst is normally loaded into a reactor tube into which gaseous reactants are introduced, resulting in gaseous (and often liquid) products.

In order to maintain a good throughput, the pressure drop across the reactor is preferably minimised. This may be achieved by increasing the porosity to a certain extent, although an increase in porosity reduces the amount of catalyst within the reactor space and thus reduces the amount of product. Thus a balance between catalyst volume in the reactor and porosity is sought.

Example 2

Pressure drop experiments were conducted for a range of catalyst shapes. The pressure drop experiments were conducted over 1 m at the bottom of a 4 m reactor tube filled with the various catalyst shapes. The gases used were a mixture of dodecane at 5.3 kg/h and nitrogen at 3.7 Vm(g) [Kgs/m$^2$]. Table 1 shows results for various shapes.

TABLE 1

Pressure drop measurements on various shapes

| Example | Shape | Dimensions | | | Relative pressure drop | Porosity |
|---|---|---|---|---|---|---|
| Comparative | Trilobe | Length 1.6 mm | | | 100% | 48.4% |
| Comparative | Flat ring | Inner diameter 3.2 mm | Outer diameter 7.0 mm | Thickness 0.5 mm | 36.59% | 60.1% |
| According to invention | Spring-ring | Inner diameter 3.1 mm | Outer diameter 6.2 mm | thickness 0.8 mm | 18.16% | 59.3% |
| According to invention | Spring-ring | Inner diameter 4.1 mm | Outer diameter 7.6 mm | Thickness 0.9 mm | 15.73 | 61% |
| According to invention | Spring-ring with uneven surface | Inner diameter 3.2 mm | Outer diameter 6 mm | Thickness 0.4 mm | 10.57% | 78.6% |

The experimental results show that for embodiments according to the present invention the pressure drop is significantly less as compared to conventional flat rings, whereas the porosity is similar.

We claim:

1. A catalyst support in the shape of a non-planar ring having a bore, said bore having an axis through its centre;
   wherein the ring has a height that is larger than the thickness of the ring,
   the height being defined as the distance between two parallel planes, whereby the axis through the bore of the ring is perpendicular to these planes, and whereby both planes are touching the ring; and
   wherein there is no rotational symmetry around the axis extending through the centre of the bore defined by the ring, and wherein the ratio of the thickness of the ring to the outer diameter of the ring is less than 0.5;
   and wherein the ring may have a helix shape provided that in that case the helix shape has at least 0.8 turns and at most 1.5 turns,
   and wherein the ring comprises a metal structure coated with a refractory oxide, said coating having a thickness of less than 500 μm and more than 50 μm.

2. A catalyst support as claimed in claim 1, wherein the ratio of the thickness of the ring to the outer diameter of the ring is more than 0.05.

3. A catalyst support as claimed in claim 1, wherein there is no symmetry across a plane orthogonal to the axis extending through the centre of the bore that is defined by the ring.

4. A catalyst support as claimed in claim 1, wherein for at least one plane that includes the axis extending through the centre of the bore, there is no symmetry across that plane.

5. A catalyst support as claimed in claim 1, wherein the height of the ring is at least 1.2 times the thickness of the ring, and at most 5 times the thickness of the ring.

6. A catalyst support as claimed in claim 1, wherein the bore has a circular shape and the diameter of the bore is 1-5 mm.

7. A catalyst support as claimed in claim 1, wherein one bore with a diameter of 1-5 mm is substantially in the centre of the ring.

8. A catalyst support as claimed in claim 1, defining a single bore with a diameter of 1-5 mm.

9. A catalyst support as claimed in claim 1, wherein the ring is discontinuous.

10. A catalyst support as claimed in claim 1 wherein said refractory oxide comprises titania.

11. A catalyst support as claimed in claim 1, wherein the ratio of the thickness of the ring to the outer diameter of the ring is less than 0.3.

12. A catalyst support as claimed in claim 1, wherein the ratio of the thickness of the ring to the outer diameter of the ring is more than 0.1.

* * * * *